(12) United States Patent
Lee et al.

(10) Patent No.: US 10,268,498 B2
(45) Date of Patent: *Apr. 23, 2019

(54) WEB BROWSER FOR SPOOFING SUPPORTED FEATURES

(71) Applicant: Apple Inc., Cupertino, CA (US)

(72) Inventors: Jonathan Jong-Ho Lee, San Francisco, CA (US); Craig M. Federighi, Mountain View, CA (US); Dean Jackson, Canberra (AU); Roger Duan Fong, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 15/346,229

(22) Filed: Nov. 8, 2016

(65) Prior Publication Data

US 2017/0116008 A1 Apr. 27, 2017

Related U.S. Application Data

(63) Continuation of application No. 14/290,704, filed on May 29, 2014, now Pat. No. 9,507,649.

(51) Int. Cl.
*G06F 9/455* (2018.01)
*G06F 9/54* (2006.01)
*G06F 16/958* (2019.01)

(52) U.S. Cl.
CPC .......... *G06F 9/45529* (2013.01); *G06F 9/541* (2013.01); *G06F 16/958* (2019.01); *G06F 16/972* (2019.01); *Y02D 10/45* (2018.01)

(58) Field of Classification Search
None
See application file for complete search history.

(56) References Cited

U.S. PATENT DOCUMENTS

| | | | |
|---|---|---|---|
| 8,181,254 B1 | 5/2012 | Kay et al. | |
| 8,285,813 B1 | 10/2012 | Colton et al. | |
| 8,327,390 B2 | 12/2012 | Erlingsson et al. | |
| 9,848,032 B2* | 12/2017 | Staudinger | H04L 67/06 |
| 2003/0100963 A1 | 5/2003 | Potts | |
| 2012/0086783 A1* | 4/2012 | Sareen | G06N 3/006 |
| | | | 348/47 |
| 2012/0088783 A1 | 4/2012 | Sareen | |
| 2012/0192155 A1 | 7/2012 | Sibey et al. | |
| 2013/0088569 A1* | 4/2013 | Fredericks | H04N 13/0048 |
| | | | 348/43 |

(Continued)

*Primary Examiner* — Tuan C Dao
(74) *Attorney, Agent, or Firm* — Womble Bond Dickinson (US) LLP

(57) ABSTRACT

Emulating as supported web browser feature when a webpage is merely testing for web browser support of various features. Frequently a web page may test for support of various features of a web browser. The present technology prevents the unnecessary and premature initiation of supported features saving a user time from having to authorize its use in addition to saving the valuable system resources (e.g. memory, power, etc.) before the supported features are actually needed by the webpage. By emulating or spoofing support of various features of a web browser, the user of a computing device can be spared authorizing use of the various features, and spared the extra power consumption of initializing the various features that may not be used.

23 Claims, 6 Drawing Sheets

(56) References Cited

U.S. PATENT DOCUMENTS

| | | |
|---|---|---|
| 2013/0157563 A1 | 6/2013 | Jain |
| 2013/0247030 A1 | 9/2013 | Kay et al. |
| 2014/0129920 A1 | 5/2014 | Sherelov et al. |
| 2014/0267316 A1* | 9/2014 | Connell .................. G06T 1/20 345/503 |
| 2014/0281457 A1* | 9/2014 | Weissmann ........... G06F 9/5077 713/2 |

* cited by examiner

WEB BROWSER FOR SPOOFING SUPPORTED FEATURES

This application is a continuation of U.S. application Ser. No. 14/290,704 filed on May 29, 2014, now issued as U.S. Pat. No. 9,507,649.

TECHNICAL FIELD

The present technology pertains to web browsers, and more specifically pertains to web browsers with supported features.

BACKGROUND

In recent years, web browsers have become more capable of handling complex webpages. Whether the browsers utilize extensions such as players like Adobe Flash player, and virtual machines like Java®, or have access to system level resources through HTML5 and Web 2.0 technologies, browsers are now capable of interpreting and rendering complex webpages. Some such webpages interpret and render complex offerings such as games displaying virtual 3-D, similar to those that were only available through specialized gaming consoles not long ago.

In support of such enhanced web, content several technologies have developed including new coding languages, and application programming interfaces, which make it easier to develop such enhanced web content. However, new features are added at a rapid pace, and not all Internet browsers support all features.

Web developers that want to take advantage of the best technology available need to know what a browser supports so that their webpages render in the best way possible given a browser's capabilities. Web developers have developed a strategy wherein when a webpage is initialized by a web browser, the web page can request basic access to the desired technologies and if the technologies are supported the browser can report back no errors. However, just because a page tests for the support of certain technologies often doesn't mean that the page is configured to take advantage of the technologies. Use of some of these technologies may expose users to potential security vulnerabilities or require significant power drains, and as such loading these resources merely for a test is undesirable.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for emulating a supported web browser feature when a webpage is merely testing for web browser support of various features. Frequently a web page may test for support of various features of a web browser. The present technology prevents the unnecessary and premature initiation of supported features saving a user time from having to authorize its use, in addition to saving the valuable system resources (e.g. memory, power, etc.) before the supported features are actually needed by the webpage. By emulating or spoofing support of various features of a web browser, the user of a computing device can be spared authorizing use of the various features, and spared the extra power consumption of initializing the various features that may not be used.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, nor model or preferred embodiments, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for emulating a supported web browser feature when a webpage is merely testing for web browser support of various features. The present technology prevents unnecessary and premature initiation of the supported features which can save a user from having to authorize its use, and can save valuable system resources (e.g., memory, power, etc.) before the supported features are actually needed by the webpage. For example the present technology can emulate a WebGL API when a webpage initializes and attempts to determine if a web browser supports the WebGL API. Frequently a web page may test for support of the WebGL API, but never actually attempt to use the WebGL API to support content on the webpage. By emulating or spoofing the WebGL API, the user of a computing device can be spared authorizing use of WebGL, and spared the extra power consumption of initializing a 3-D construct on a graphics processing unit (GPU) that may not be used.

As used herein, the term "user" shall be considered to mean a user of an electronic device(s). Actions performed by a user in the context of computer software shall be considered to be actions taken by a user to provide an input to the electronic device(s) to cause the electronic device to perform the steps embodied in computer software. In some instances a user can refer to a user account associated with a particular electronic device.

Figure 1:
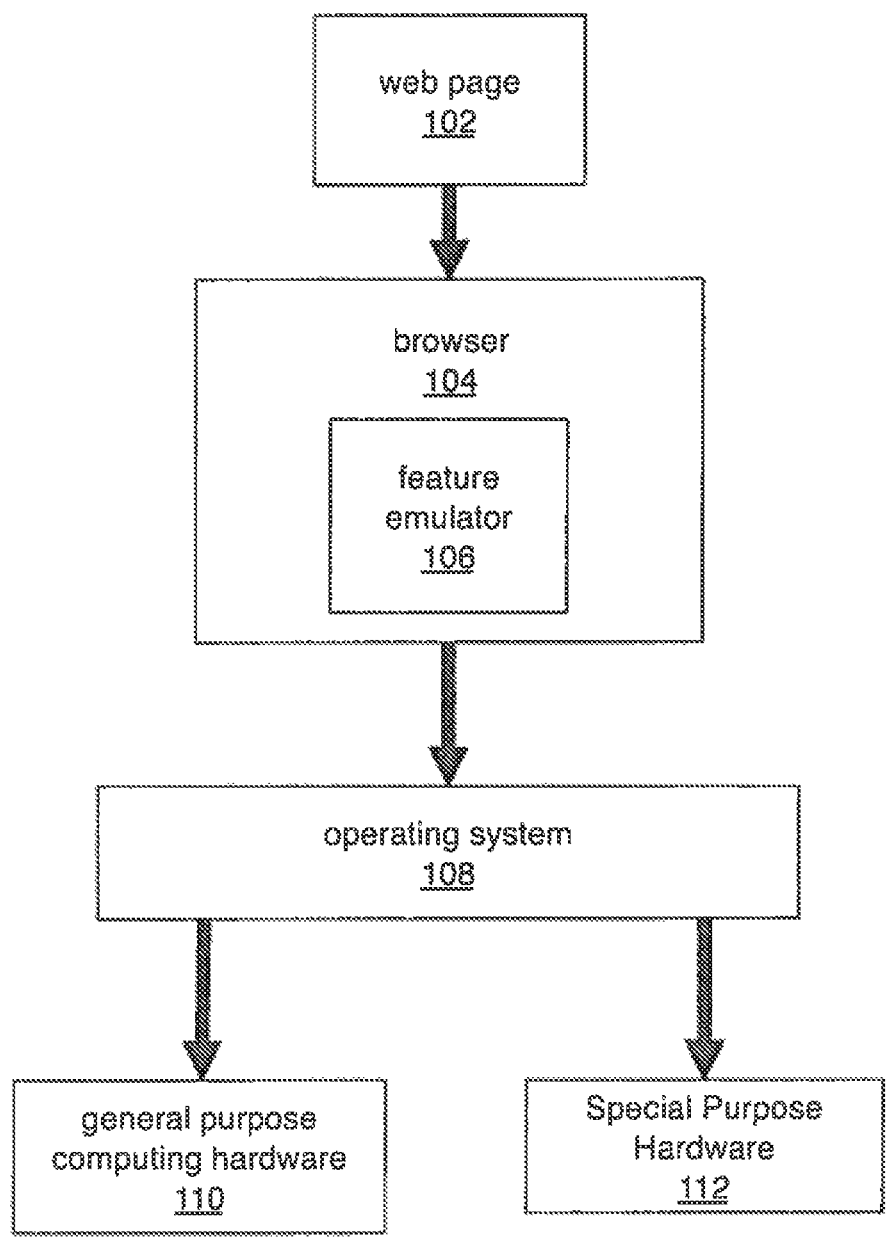
FIG. 1 illustrates an exemplary system architecture for use with the present technology.

FIG. 1 illustrates an exemplary system architecture for use with the present technology. For example a computing device (such as the computing devices illustrated in FIG. 5A and FIG. 5B) can execute various software including an operating system 108, and web browser 104. As web browsers commonly do, the web browser 104 can be used to navigate the Internet and be asked to load and render various webpages 102.

The web browser of the present technology can include a feature emulator 106 which will be discussed in more detail below. The web browser 104 can make use of certain services and software provided by the operating system 108. As operating systems commonly do, the operating system 108 can provide system level software for accessing and using system hardware such as general purpose computing hardware 110, and special purpose hardware 112.

In a general sense, general purpose hardware can be considered hardware that is almost always activated in the general usage of a system, while special purpose hardware can be considered hardware that is often activated only when required. General purpose hardware 110 can include any hardware that is used to perform basic computing system functions including but not limited to a central computing unit (or processor), system bus, memory, storage, user interface devices, display outputs, audio outputs, etc. Special purpose hardware 112 can include any hardware of limited use for specialized purposes including but not limited to graphics processing unit (GPU), graphics memory, location detecting hardware, motion detecting hardware, cellular communication hardware, etc. In some cases general purpose computing hardware 110 can be used in an unusual fashion and can constitute special purpose hardware 112. Likewise, in some systems, one or more items identified as special purpose hardware may also or frequently be activated and as such should be considered general purpose hardware 110 on such systems.

While in some embodiments the present technology is described with respect to deferring a potential activation of one or more special purpose hardware 112 components, in some embodiments the present technology can extend to delaying use of a general purpose computing hardware component too.

Figure 2:
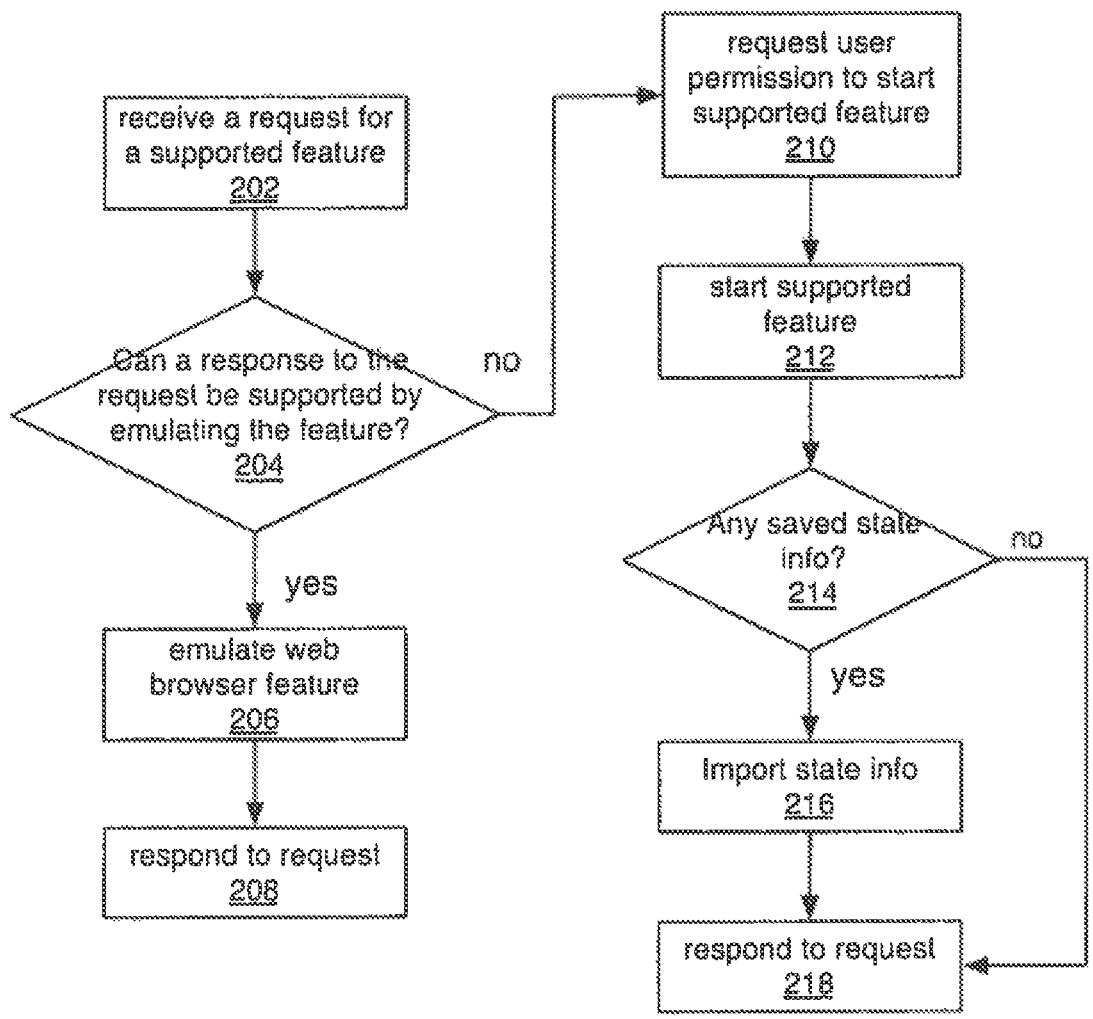
FIG. 2 illustrates an exemplary process for emulating a supported feature of a web browser.

FIG. 2 illustrates an exemplary process for emulating a supported feature of a web browser. Upon initializing, a webpage 102 might attempt to check to determine whether a web browser supports certain features. The webpage 102 can issue and the web browser 104 can receive a request for the supported feature 202.

The web browser 104 determines whether it can successfully emulate or spoof the supported feature with a feature emulator module 106 without actually initializing the supported feature 202. The web browser can be configured with a collection of potential commands and feature requests that can be emulated. In general, the web browser can emulate, with feature emulator module 106, requests or commands to create a context, create an array, create a buffer, etc. while the web browser cannot emulate requests or commands to access specialized hardware to perform the actual function of the hardware, or read out of memory reserved for the specialized hardware. For example, the feature emulator module 106 can establish a canvas and associate a 3-D drawing context with the canvas, but it cannot actually draw or manipulate a 3-D object. Similarly, a feature emulator module can emulate initializing GPS hardware, but cannot return GPS coordinates.

If the feature emulator module 106 can emulate the supported feature sufficiently to respond to the request without a fatal error 204, the feature emulator module 106 emulates the web browser feature 206 and responds to the webpage 208.

Often a webpage will attempt to access a supported feature when initializing. However, the webpage may not actually make use of the supported feature for any other purpose than to confirm that the web browser has the stated capability. In such instances the feature emulator can handle the request from the webpage by emulating the supported feature using only general purpose hardware 110, thus saving resources.

Of course, sometimes a webpage's initial requests to access a supported feature a prelude to actually utilizing the supported feature to display content. In such instances the method illustrated in FIG. 2 might proceed as already explained where the feature emulator emulates the supported feature during initialization of the webpage, however, the webpage might make a subsequent request for the supported feature 202, which the feature emulator module 106 cannot emulate 204.

When the feature emulator module 106 can not emulate the supported feature adequately to respond to a request for the feature, the web browser can request user permission 210 to start the supported feature. Assuming that permission was granted by a user of the computing device, the feature is started 212.

Since, the feature emulator module 106 may have already emulated some supported feature functions at 206, it is important to check the feature emulator module 106 for any saved state information pertinent to the supported feature 214. Since the webpage does not know that its earlier requests for the supported feature were actually spoofed, it assumes that the results of its earlier interactions are still in memory. For example, if a given context was loaded, or a memory structure was established, the webpage assumes the context is in fact loaded and the memory structure is established and can be used for further operations. As such if there is any saved state information it can be imported 216 into the supported feature.

As noted above, in some instances the feature emulator module 106 can only imperfectly emulate the supported feature. To accommodate such occurrences, the feature emulator module can record all operations that have been performed with the supported feature that have been emulated. For operations that have been adequately emulated, it may be sufficient to just record the state information and transfer it to the memory associated with the supported feature. For operations that have not been adequately emulated, the feature emulator module 106 might have to instruct the supported feature to re-perform the operations.

Once the state information is imported and the supported feature fully initialized and caught up with the previous instructions given by the webpage the supported feature can respond to the request 218.

Figure 3:
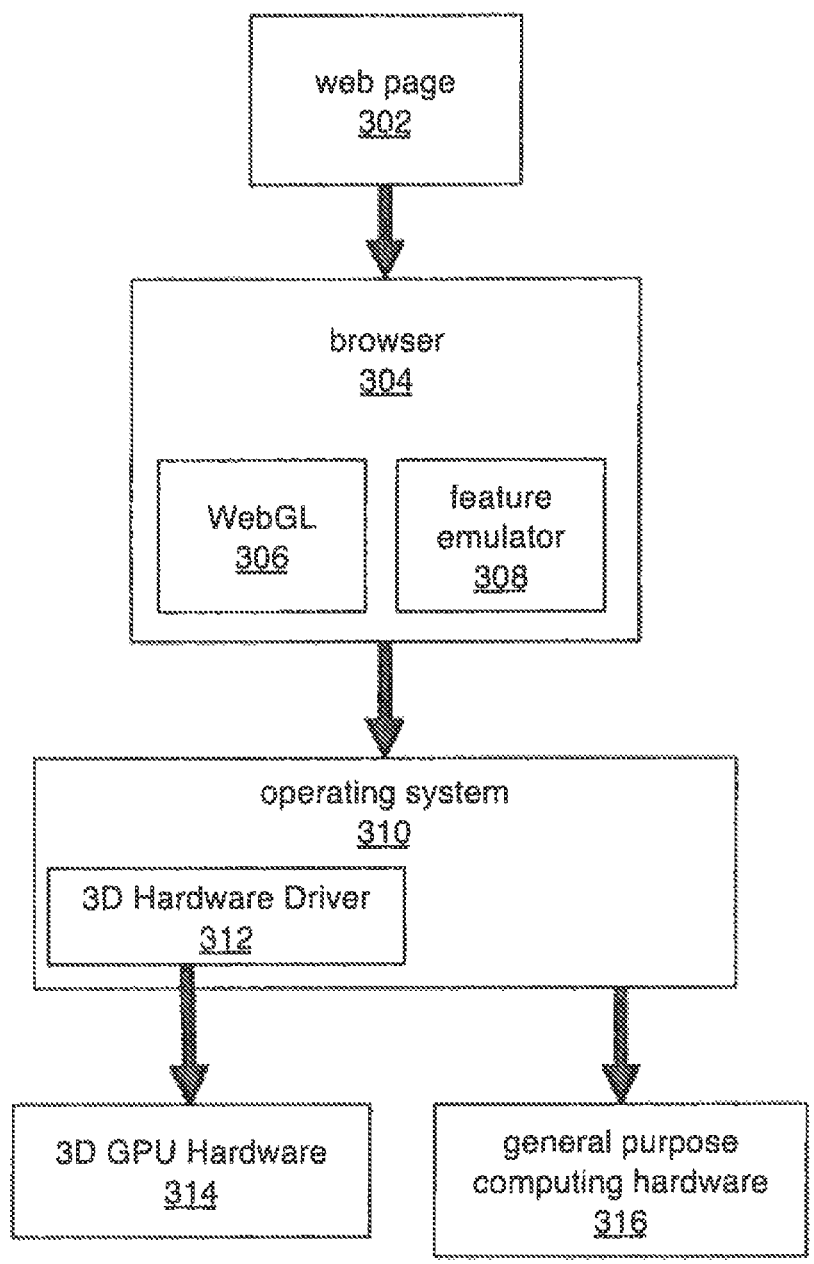
FIG. 3 illustrates another exemplary system architecture for use with the present technology when emulating a WebGL feature.
Figure 4:
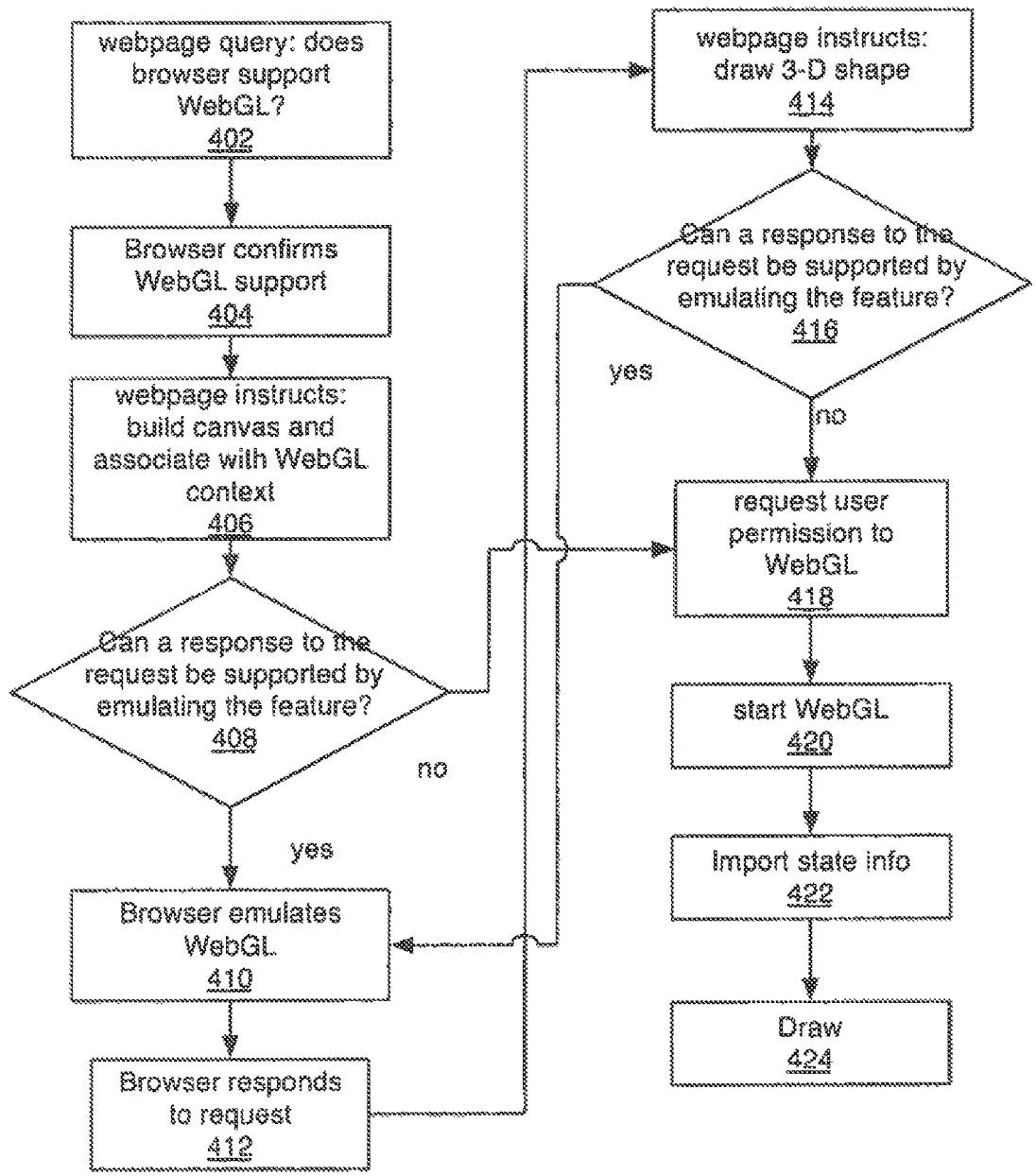
FIG. 4 illustrates another exemplary process for emulating a WebGL feature of a web browser.

FIG. 3 illustrates an exemplary system architecture for use with the present technology when emulating a WebGL feature, and FIG. 4 illustrates an exemplary process for emulating a WebGL feature of a web browser. These two figures will be discussed together for the purposes of explaining the present technology with respect to a specific supported feature WebGL.

WebGL (Web Graphics Library) is a JavaScript API for rendering interactive 3D graphics and 2D graphics within any compatible web browser without the use of plug-ins, WebGL is integrated completely into all the web standards of the browser allowing GPU accelerated usage of physics and image processing and effects as part of the web page canvas.

Webpage 302 can query the web browser 304 to determine whether the web browser 304 supports WebGL 402. The web browser 304 confirms WebGL support 404. In some embodiments webpages attempt to actually initialize WebGL with a basic instruction. In this example, the webpage 302 instructs the web browser 304 to build a canvas and associate the canvas with a WebGL context 406. In many cases a webpage might not make the query regarding support for WebGL and instead, in such cases, the method can begin at step 406.

The web browser 304 determines that it can handle the request 403 and emulates WebGL 410 using its feature emulator module 303. All of the computing functions to handle the emulation are passed through the operating system 310 to the general purpose computing hardware 316. The browser responds to the request 412 as if the request were handled through WebGL itself.

If a webpage doesn't actually include content that requires WebGL, the method can end without ever having to utilize WebGL or the specialized graphics hardware 314. However, if the webpage does include content that requires 3D graphics processing or other WebGL supported content, the webpage can instruct the browser to perform a drawing operation 414. The web browser cannot emulate a drawing operation 416 and therefore must initialize WebGL. The web browser first requests permission from the user of the computing device to utilize WebGL 418, and assuming the user has given the necessary permission, the browser initializes WebGL 420. Initializing WebGL requires powering up graphics hardware 314, and passing any state information 422 associated with the prior emulation of the feature to the graphics hardware 314 including its associated memory.

The web browser then fulfills the drawing operation 424 by utilizing the support WebGL API 306 to access the necessary graphics hardware drivers 312 and utilize the graphics hardware 314 to complete the drawing operation.

Figure 5A:
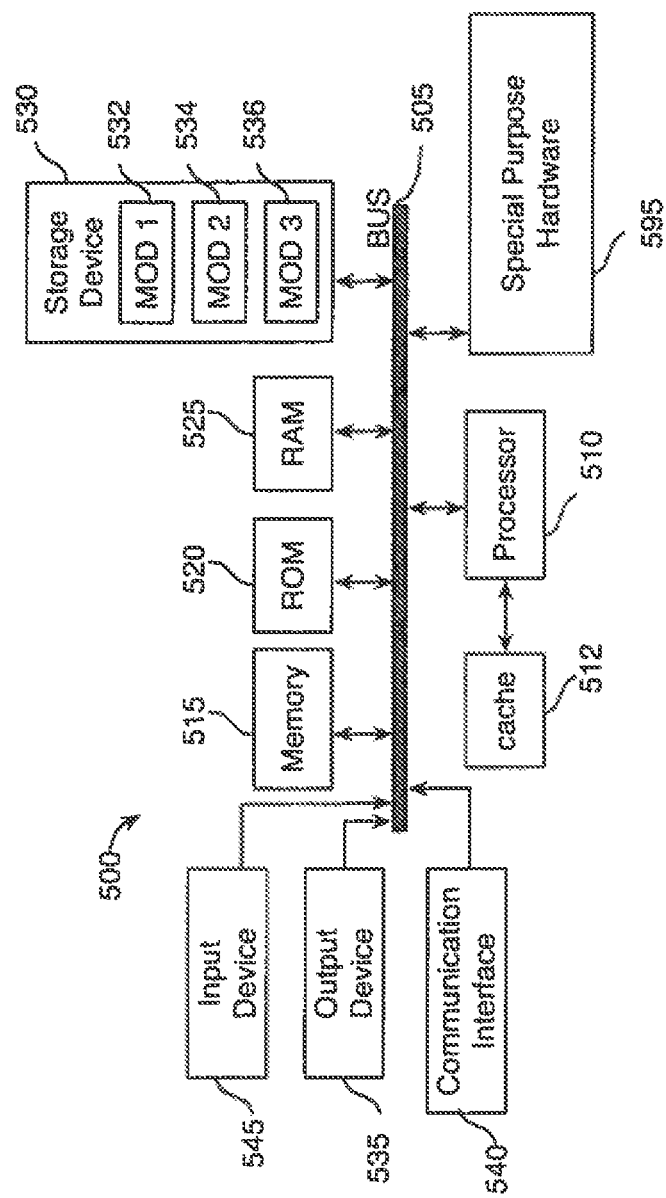
FIGS. 5A and 5B illustrate exemplary computing system environments on which the present technology can operate.
Figure 5B:
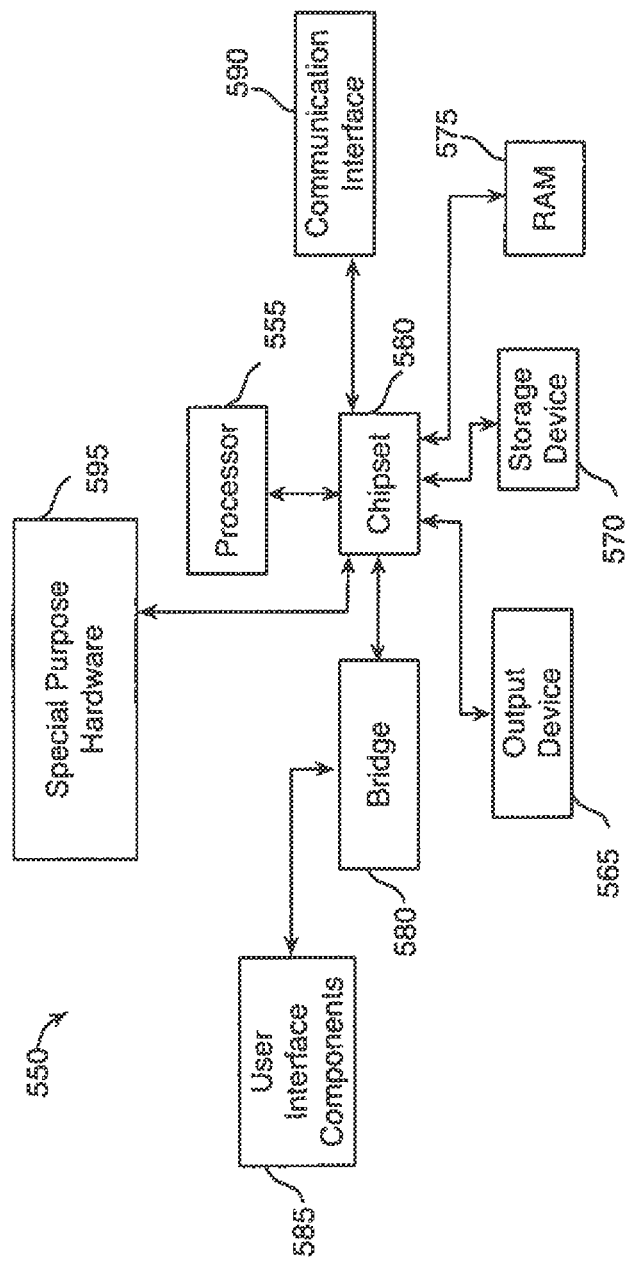

FIG. 5A, and FIG. 5B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

Special purpose hardware 595 can include hardware and software of use for specialized purposes including but not limited to a graphics processing unit (GPU), graphics memory, location detecting hardware, motion detecting hardware, cellular communication hardware, etc.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 555 can include a keyboard, a microphone, touch detection and processing circuitry, a pointing device, such as a mouse, and so on. In general, inputs to system 550 can come from any of a variety or sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

Special purpose hardware 595 can include hardware and software of use for specialized purposes including but not limited to a graphics processing unit (GPU), graphics memory, location detecting hardware, motion detecting hardware, cellular communication hardware, etc.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer implemented method comprising:
   receiving by a web browser executed by one or more processors, a first request for a web browser feature, the web browser feature to be executed by hardware within special purpose hardware;
   emulating the web browser feature by the web browser via general purpose hardware separate from the special purpose hardware which has a low power state, wherein the emulating includes creating an emulation context associated with the web browser feature, the emulation context including state information associated with the web browser feature; and
   returning by the web browser, a response to the first request.

2. The computer implemented method of claim 1, further comprising:
   receiving by the web browser, a second request for the web browser feature, wherein a response to the second request is to include output generated by the special purpose hardware;
   initializing by the web browser the web browser feature and the special purpose hardware;
   generating, by the special purpose hardware, the response to the second request; and
   receiving by the web browser, the response to the second request for the web browser feature from the special purpose hardware.

3. The computer implemented method of claim 2, further comprising:
   recording by the web browser, any change in state information associated with the web browser feature;
   storing the change in state information into the emulation context; and
   as part of the initializing the web browser feature, initializing a feature context for the web browser feature and passing the state information from the emulation context to the feature context.

4. The method of claim 2 wherein the second request is after the first request and the emulating allows the special purpose hardware to be kept in the low power state while the web browser returns the response to the first request.

5. The computer implemented method of claim 3, further comprising receiving by the web browser a third request for establishing a web browser canvas, wherein the web browser canvas is associated with the feature context of the web browser feature.

6. The computer implemented method of claim 5, wherein the web browser feature is a WebGL API.

7. The computer implemented method of claim 6, further comprising:
receiving by the web browser, a fourth request for an interactive session associated with the WebGL API, wherein the interactive session comprises performing by hardware within special purpose hardware one or more 3D and/or 2D graphics rendering operations; and
returning by the web browser, an interactive response of the interactive session.

8. The computer implemented method of claim 7, wherein performing one or more 3D and/or 2D graphics rendering operations comprises performing a drawing operation by hardware within special purpose hardware.

9. The computer implemented method of claim 8, wherein the 3D and/or 2D graphics rendering operations are performed within a web browser without a use of plug-ins.

10. A non-transitory computer-readable medium storing computer executable instructions which, when executed by one or more processors of a computing system, cause the one or more processors to perform operations comprising:
receiving by a web browser executed by one or more processors, a first request for a web browser feature, the web browser feature to be executed by hardware within special purpose hardware;
emulating the web browser feature by the web browser via general purpose hardware separate from the special purpose hardware which has a low power state, wherein the emulating includes creating an emulation context associated with the web browser feature, the emulation context including state information associated with the web browser feature; and
returning by the web browser, a response to the first request.

11. The non-transitory computer-readable medium of claim 10, wherein the operations further comprise:
receiving by the web browser, a second request for the web browser feature, wherein a response to the second request is to include output generated by the special purpose hardware;
initializing by the web browser the web browser feature and the special purpose hardware;
generating, by the special purpose hardware, the response to the second request; and
receiving by the web browser, the response to the second request for the web browser feature from the special purpose hardware.

12. The non-transitory computer-readable medium of claim 11, wherein the operations further comprise:
recording by the web browser, any change in state information associated with the web browser feature;
storing the change in state information into the emulation context; and
as part of the initializing the web browser feature, initializing a feature context for the web browser feature and passing the state information from the emulation context to the feature context.

13. The medium of claim 11 wherein the second request is after the first request and the emulating allows the special purpose hardware to be kept in the low power state while the web browser returns the response to the first request.

14. The non-transitory computer-readable medium of claim 12, wherein the operations further comprise receiving by the web browser a third request for establishing a web browser canvas, wherein the web browser canvas is associated with the feature context of the web browser feature.

15. The non-transitory computer-readable medium of claim 14, wherein the web browser feature is a WebGL API.

16. The non-transitory computer-readable medium of claim 15, wherein the operations further comprise:
receiving by the web browser, a fourth request for an interactive session associated with the WebGL API, wherein the interactive session comprises performing by hardware within special purpose hardware one or more 3D and/or 2D graphics rendering operations; and
returning by the web browser, an interactive response of the interactive session.

17. A system comprising:
one or more processors coupled to a bus;
special purpose hardware coupled to the bus; and
a computer readable medium containing computer executable instructions which, when executed by the one or more processors, causing the one or more processors to perform operations comprising:
receiving by a web browser executed by one or more processors, a first request for a web browser feature, the web browser feature to be executed by hardware within special purpose hardware;
emulating the web browser feature by the web browser via general purpose hardware separate from the special purpose hardware which has a low power state, wherein the emulating includes creating an emulation context associated with the web browser feature, the emulation context including state information associated with the web browser feature; and
returning by the web browser, a response to the first request.

18. The system of claim 17, wherein the operations further comprise:
receiving by the web browser, a second request for the web browser feature, wherein a response to the second request is to include output generated by the special purpose hardware;
initializing by the web browser the web browser feature and the special purpose hardware;
generating, by the special purpose hardware, the response to the second request; and
receiving by the web browser, the response to the second request for the web browser feature from the special purpose hardware.

19. The system of claim 18, wherein the operations further comprise:
recording by the web browser, any change in state information associated with the web browser feature;
storing the change in state information into the emulation context; and
as part of the initializing the web browser feature, initializing a feature context for the web browser feature and passing the state information from the emulation context to the feature context.

20. The system of claim 19, wherein the operations further comprise receiving by the web browser a third request for establishing a web browser canvas, wherein the web browser canvas is associated with the feature context of the web browser feature.

21. The system of claim 20, wherein the web browser feature is a WebGL API.

22. The system of claim 21, wherein the operations further comprise:
receiving by the web browser, a fourth request for an interactive session associated with the WebGL API, wherein the interactive session comprises performing by hardware within special purpose hardware one or more 3D and/or 2D graphics rendering operations; and returning by the web browser, an interactive response of the interactive session.

23. The system of claim 18 wherein the second request is after the first request and the emulating allows the special purpose hardware to be kept in the low power state while the web browser returns the response to the first request.

\* \* \* \* \*